US011325599B2

(12) United States Patent
Hirota et al.

(10) Patent No.: US 11,325,599 B2
(45) Date of Patent: May 10, 2022

(54) VEHICLE CONTROL SYSTEM FOR ADJUSTING LONGTITUDINAL MOTION TO REDUCE DEVIATION OF LATERAL MOTION

(71) Applicant: HONDA MOTOR CO., LTD., Tokyo (JP)

(72) Inventors: Masahiro Hirota, Wako (JP); Takeshi Kojima, Wako (JP); Naoto Okubo, Wako (JP); Hitoshi Sasaki, Wako (JP); Shigeru Doi, Wako (JP); Ryoma Kanda, Wako (JP); Yuya Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 16/696,341

(22) Filed: Nov. 26, 2019

(65) Prior Publication Data

US 2020/0172102 A1 Jun. 4, 2020

(30) Foreign Application Priority Data

Nov. 29, 2018 (JP) .............................. JP2018-223027

(51) Int. Cl.
*B60W 30/18* (2012.01)
*B60W 10/04* (2006.01)
(Continued)

(52) U.S. Cl.
CPC ............ *B60W 30/18* (2013.01); *B60W 10/04* (2013.01); *B60W 10/18* (2013.01); *B60W 10/22* (2013.01);
(Continued)

(58) Field of Classification Search
None
See application file for complete search history.

(56) References Cited

U.S. PATENT DOCUMENTS 7,562,948 B2    7/2009  Matsumoto et al.
9,365,196 B2 *  6/2016  Vorreiter ................. B60T 8/171
                        (Continued)

FOREIGN PATENT DOCUMENTS

JP      H0989076 A     3/1997
JP      2005306282 A   11/2005
                       (Continued)

OTHER PUBLICATIONS

JPO Notice of Reasons for Refusal for Japanese Patent Application No. 2018-223027 dated Oct. 6, 2020; 7 pp.

*Primary Examiner* — Todd Melton
(74) *Attorney, Agent, or Firm* — Armstrong Teasdale LLP (57) ABSTRACT

A vehicle motion control system includes: a steering angle sensor for detecting a steering angle; a vehicle speed sensor for detecting a vehicle speed; a lateral acceleration sensor for detecting an actual lateral acceleration of a vehicle body; a reference lateral acceleration calculation unit configured to calculate a reference lateral acceleration from the steering angle and the vehicle speed; a required longitudinal force calculation unit configured to calculate a required longitudinal force for reducing a deviation of the actual lateral acceleration relative to the reference lateral acceleration; and a longitudinal force control unit configured to control an output of at least one of a brake and a power plant such that the required longitudinal force is generated.

9 Claims, 5 Drawing Sheets

(51) Int. Cl.
*B60W 10/18* (2012.01)
*B60W 10/22* (2006.01)
*B60W 30/02* (2012.01)
*B60W 30/045* (2012.01)

(52) U.S. Cl.
CPC ..... *B60W 2400/00* (2013.01); *B60W 2520/10* (2013.01); *B60W 2520/125* (2013.01); *B60W 2540/18* (2013.01); *B60W 2710/18* (2013.01); *B60W 2710/226* (2013.01); *B60W 2720/106* (2013.01)

(56) References Cited

U.S. PATENT DOCUMENTS

| | | | |
|---|---|---|---|
| 10,266,173 B2 | 4/2019 | Sunahara et al. | |
| 10,507,835 B2 * | 12/2019 | Park | B60W 40/09 |
| 10,926,794 B2 * | 2/2021 | Murayama | B62D 6/003 |
| 2017/0137023 A1 * | 5/2017 | Anderson | B60W 50/14 |

FOREIGN PATENT DOCUMENTS

| | | | |
|---|---|---|---|
| JP | 2011031739 A | 2/2011 | |
| JP | 2013067382 A | 4/2013 | |
| JP | 2017087890 A | 5/2017 | |
| JP | 2018030582 A | 3/2018 | |
| JP | 2018090248 A | 6/2018 | |

* cited by examiner

VEHICLE CONTROL SYSTEM FOR ADJUSTING LONGTITUDINAL MOTION TO REDUCE DEVIATION OF LATERAL MOTION

TECHNICAL FIELD

The present invention relates to a vehicle motion control system for controlling the motion of a vehicle.

BACKGROUND ART

There is known a deceleration control apparatus for controlling the deceleration of an automotive vehicle in accordance with a traveling state of the vehicle to thereby ensure stable traveling of the vehicle (see JP2005-306282A, for example). This deceleration control apparatus determines a reference target yaw rate based on the steering angle and the vehicle speed and calculates a target vehicle speed by multiplying a lateral acceleration limit set by the driver by an estimated road friction coefficient and dividing the result of multiplication by the reference target yaw rate. When the actual vehicle speed is higher than the target vehicle speed, the deceleration control apparatus performs deceleration control.

The conventional deceleration control apparatus determines the vehicle behavior by using the reference target yaw rate calculated based on the steering angle and the vehicle speed, and therefore, it can control the yaw motion of the vehicle but cannot control the travel trajectory of the vehicle. Namely, in such cases as when the vehicle travels around a curve of a road having a low road friction coefficient (p) (hereinafter referred to as a low-μ road) or when the vehicle enters a curve at a speed higher than a proper speed, even if the vehicle is controlled to make the yaw rate of the vehicle approach the target value, the trajectory of the vehicle may nonetheless deviate from the one intended by the driver (trajectory along the road).

SUMMARY OF THE INVENTION

In view of the above background, a primary object of the present invention is to provide a vehicle motion control system that can prevent the trajectory of the vehicle from becoming different from the one intended by the driver when the vehicle makes a turn.

Means to Accomplish the Task

To achieve the above object, one embodiment of the present invention provides a vehicle motion control system (30), comprising: a steering angle sensor (34) for detecting a steering angle (60; a vehicle speed sensor (33) for detecting a vehicle speed (V); a lateral acceleration sensor (35) for detecting an actual lateral acceleration (Gy) of a vehicle body (2); a reference lateral acceleration calculation unit (41) configured to calculate a reference lateral acceleration (Gyref) from the steering angle (δf) and the vehicle speed (V); a required longitudinal force calculation unit (43) configured to calculate a required longitudinal force (Fx) for reducing a deviation (ΔGy1) of the actual lateral acceleration (Gy) relative to the reference lateral acceleration (Gyref); and a longitudinal force control unit (44) configured to control an output of at least one of a brake (20) and a power plant (6) such that the required longitudinal force (Fx) is generated.

According to this configuration, when the actual lateral acceleration is lower (or smaller in absolute value) than the reference lateral acceleration, a required longitudinal force for reducing the deviation between the actual lateral acceleration and the reference lateral acceleration, namely, a braking force, is output to at least one of the brake and the power plant. Thereby, the vehicle speed is lowered such that the radius of the travel trajectory of the vehicle prevented from becoming larger than intended. Particularly, the vehicle is prevented from deviating from the intended trajectory outward when the vehicle travels around a curve of a low-μ road.

In the above configuration, preferably, a dead zone is provided to each of the reference lateral acceleration (Gyref) and the actual lateral acceleration (Gy). According to this configuration, it is possible to prevent the deviation from changing frequently due to the noise in the output of the steering angle sensor, the vehicle speed sensor, and/or the lateral acceleration sensor, and therefore, deterioration of the driving stability of the vehicle due to frequent change of the required longitudinal force can be suppressed.

In the above configuration, preferably, the required longitudinal force calculation unit (43) is configured to calculate the required longitudinal force (Fx) as a feedback control process based on the deviation (ΔGy1).

According to this configuration, the required longitudinal force necessary to maintain the travel trajectory can be calculated at an appropriate time by the feedback control based on the deviation, and therefore, the deviation is prevented from becoming excessively large, namely, the trajectory of the vehicle is prevented from deviating outward when the vehicle makes a turn.

In the above configuration, preferably, the vehicle motion control system further comprises a steering state determination unit (42) configured to determine a steering state (SS) based on the actual lateral acceleration (Gy) and the reference lateral acceleration (Gyref), wherein the required longitudinal force calculation unit (43) is configured to set a threshold value (Gyth) for the deviation (ΔGy1) according to at least one of the steering state (SS), the vehicle speed (V), and the actual lateral acceleration (Gy) and to perform the feedback control process based on a control deviation (ΔGy2) that is obtained by providing a dead zone defined by the threshold value (Gyth) to the deviation (ΔGy1).

According to this configuration, the degree of intervention of control for generating the required longitudinal force to be varied depending on the driving state parameters, such as the steering state, the vehicle speed, and the actual lateral acceleration, whereby the degree of freedom in setting of the longitudinal force control is improved.

In the above configuration, preferably, the required longitudinal force calculation unit (43) is configured to calculate the required longitudinal force (Fx) by multiplying the control deviation (ΔGy2) by a control gain (G).

According to this configuration, proportional control based on the control deviation is performed, and since the calculation load for the required longitudinal force is small, the required longitudinal force corresponding to the control deviation can be calculated immediately. Therefore, the trajectory of the vehicle is prevented from deviating from the one intended by the driver.

In the above configuration, preferably, the required longitudinal force calculation unit (43) is configured to set a limit value (Fxlim) for the required longitudinal force (Fx) according to the control deviation (ΔGy2) and the vehicle speed (V) and to limit the required longitudinal force (Fx) to the limit value (Fxlim). According to this configuration, it is possible to prevent the driver from experiencing discomfort caused by the generation of a large required longitudinal force that is not attributed to the driver's operation.

In the above configuration, preferably, a dead zone is provided to the required longitudinal force (Fx).

According to this configuration, frequent switching of the sign (positive or negative) of the required longitudinal force can be prevented, and this prevents the driver from experiencing discomfort caused by the generation of the required longitudinal force.

In the above configuration, preferably, the vehicle motion control system further comprises: s suspension device (3) configured to be capable of generating a pitching moment in the vehicle body (2); and a pitching moment control unit (47) configured to control the pitching moment generated by the suspension device (3), wherein the pitching moment control unit (47) comprises: a required pitching moment calculation unit (48) configured to calculate a required pitching moment (Mp) which is a pitching moment in a direction to cancel out a pitching moment caused due to the required longitudinal force (Fx); and a suspension control unit (49) configured to control the suspension device (3) to generate the required pitching moment (Mp).

According to this configuration, it is possible to prevent the driver from experiencing discomfort by a pitching moment that could be caused to act on the vehicle 1 due to the generation of the required longitudinal force.

In the above configuration, preferably, the suspension device (3) includes at least one of a variable damping force damper (12) and an air suspension device.

According to this configuration, the required pitching moment can be generated by using the variable damping force damper and/or the air suspension device available as an existing product, without a need for dedicated components.

Thus, according to the present invention, it is possible to provide a vehicle motion control system that can prevent the trajectory of the vehicle from becoming different from the one intended by the driver when the vehicle makes a turn.

DESCRIPTION OF THE PREFERRED EMBODIMENT(S)

Figure 1:
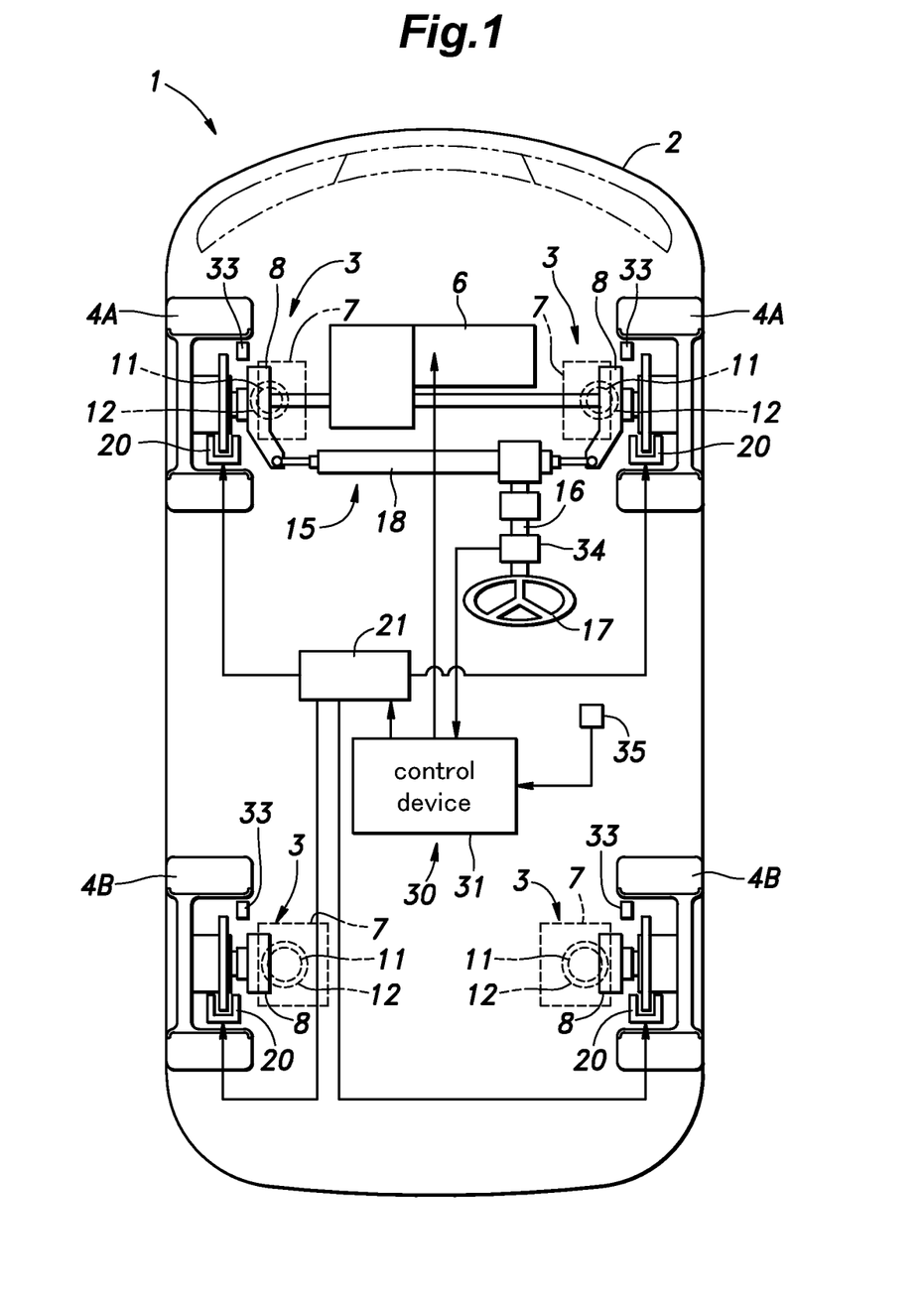
FIG. 1 is a diagram schematically showing a configuration of a vehicle provided with a vehicle motion control system according to an embodiment of the present invention.

In the following, an embodiment of a vehicle motion control system 30 according to the present invention will be described with reference to the drawings. FIG. 1 is a diagram schematically showing a configuration of a vehicle 1 provided with the vehicle motion control system 30 according to the embodiment. As shown in FIG. 1, the vehicle 1 regarding the embodiment consists of a four-wheeled automobile having left and right front wheels 4A and left and right rear wheels 4B supported on a vehicle body 2, which forms a framework of the vehicle 1, via respective suspension devices 3.

The vehicle 1 is provided with a power plant (power source) 6 for driving the wheels 4 (4A, 4B). The power plant 6 may include at least one of an internal combustion engine (such as a gasoline engine or a diesel engine) and an electric motor. In the present embodiment, the power plant 6 is a gasoline engine and the vehicle 1 consists of a front-wheel-drive vehicle in which the driving force and the rotational resistance (braking force) of the power plant 6 are transmitted to the front wheels 4A. In another embodiment, the vehicle 1 may consist of a four-wheel-drive vehicle or a rear-wheel-drive vehicle.

The power plant 6 can provide a braking force to the front wheels 4A by retarding the ignition timing through retard control to reduce the generated torque.

Each suspension device 3 includes a suspension arm 7 rotatably supported by the vehicle body 2, a knuckle 8 supported by the suspension arm 7 and rotatably supporting the corresponding one of the front wheels 4A and the rear wheels 4B, and a spring 11 and a damper 12 provided between the vehicle body 2 and the suspension arm 7.

The dampers 12 are variable damping force dampers capable of varying the damping force and can provide the vehicle body 2 with a moment by varying the respective damping force. For instance, the dampers 12 are controlled to increase the damping force during acceleration/deceleration to generate a pitching moment in a direction to cancel out the pitching moment caused in the vehicle body 2 due to a longitudinal force (fore-and-aft force) acting on the vehicle 1. Also, the dampers 12 are controlled to increase the damping force during turning to generate a rolling moment in a direction to cancel out the rolling moment caused in the vehicle body 2 due to a centrifugal force acting on the vehicle 1.

The vehicle 1 is provided with a steering device 15 configured to steer the front wheels 4A. The steering device 15 includes a steering shaft 16 supported to be rotatable about an axis of its own, a steering wheel 17 provided on one end of the steering shaft 16, and a rack shaft 18 engaging with a pinion provided on the other end of the steering shaft 16 and extending laterally such that left and right ends of the rack shaft 18 are respectively connected to left and right knuckles 8 via associated tie rods. When the steering wheel 17 attached to the steering shaft 16 is rotated, the rack shaft 18 moves laterally to rotate the knuckles 8 associated with the front wheels 4A, whereby the left and right front wheels 4A are steered. Also, the steering shaft 16 is provided with an electric motor for generating an assist torque in response to a steering operation by a driver.

Each of the front wheels 4A and the rear wheels 4B is provided with a brake 20. The brake 20 consists of a disc brake, for example, and is controlled by a hydraulic pressure supplied from a hydraulic pressure supply device 21 to provide a braking force to the corresponding one of the front wheels 4A and the rear wheels 4B. The hydraulic pressure supply device 21 can independently control the hydraulic pressure supplied to each brake 20, whereby the braking force provided by the brakes 20 to the front wheels 4A and the rear wheels 4B can be varied independently.

The vehicle 1 is provided with a vehicle motion control system 30 for controlling the vehicle motion. The vehicle motion control system 30 includes a control device 31 as a main part thereof. The control device 31 is an electronic control circuit (ECU) constituted of a microcomputer, a ROM, a RAM, peripheral circuits, an input/output interface, various drivers, and the like. The vehicle body 2 is provided thereon with an accelerator pedal sensor for detecting an amount of operation of an accelerator pedal and a brake pedal sensor for detecting an amount of operation of a brake pedal. The control device 31 performs various control functions. As one control function, the control device 31 calculates a target braking force that should be generated by each brake 20 based on the amount of operation of the brake pedal and controls the hydraulic pressure supply device 21 according to the target braking force. Further, as another control function, the control device 31 controls the power plant 6 according to the amount of operation of the accelerator pedal.

Regardless of the driver's operation of the accelerator pedal and the brake pedal, the control device 31 calculates a required longitudinal force Fx that should be applied to the vehicle 1 based on vehicle state quantities representing a motion state of the vehicle 1 and controls the brakes 20 and/or the power plant 6 to generate the calculated required longitudinal force Fx. In addition, the control device 31 calculates a required pitching moment Mp based on the required longitudinal force Fx, where the required pitching moment Mp is calculated as a pitching moment (nose-up, for example) that should be applied to the vehicle 1 in a direction to cancel out the pitching moment caused due to the required longitudinal force Fx, and controls the dampers 12 to generate the required pitching moment Mp. The vehicle state quantities include a front wheel steering angle δf which is a steering angle of the front wheels 4A, a vehicle speed V which is a traveling speed of the vehicle 1, a lateral acceleration actually generated in the vehicle body 2 (hereinafter referred to as an actual lateral acceleration Gy), and so on.

The vehicle body 2 is provided with vehicle speed sensors 33, a front wheel steering angle sensor 34, and a lateral acceleration sensor 35, which serve as vehicle state detecting means. The vehicle speed sensors 33 are provided for the respective front wheels 4A and rear wheels 4B and output pulse signals in accordance with the rotation speeds of the respective front wheels 4A and rear wheels 4B to the control device 31. The control device 31 obtains the wheel speeds of the front wheels 4A and the rear wheels 4B based on the signals from the vehicle speed sensors 33 and obtains the vehicle speed V by averaging the wheel speeds. The vehicle speed V has a positive value when the vehicle is traveling forward and a negative value when the vehicle is traveling backward. The front wheel steering angle sensor 34 outputs a signal corresponding to the rotation angle of the steering shaft 16 to the control device 31. The control device 31 obtains the front wheel steering angle δf, which is a steering angle of the front wheels 4A, based on the signal from the front wheel steering angle sensor 34. The front wheel steering angle δf has a positive value when the vehicle is turning left and a negative value when the vehicle is turning right. The lateral acceleration sensor 35 is provided for detecting the actual lateral acceleration Gy generated in the vehicle body 2 at around the center of gravity of the vehicle 1 and outputs a signal corresponding to the lateral acceleration of the vehicle body 2 to the control device 31. The control device 31 obtains the actual lateral acceleration Gy generated in the vehicle 1 based on the signal from the lateral acceleration sensor 35. The actual lateral acceleration Gy has a positive value when the vehicle is turning left and a negative value when the vehicle is turning right.

It is to be noted that in a case where the lateral acceleration detected by the lateral acceleration sensor 35 contains a component of a gravitational acceleration due to a lateral tilt angle of the vehicle body 2 caused by a transverse gradient of a road surface (a bank or a cant), a roll angle of the vehicle body 2, and the like, it is preferred to estimate the lateral tilt angle of the vehicle body 2 and to use a value obtained by removing the component attributed to the lateral tilt angle of the vehicle body 2 from the detection value of the lateral acceleration sensor 35 as the actual lateral acceleration Gy. The lateral tilt angle of the vehicle body 2 can be estimated by using an inertial measurement unit (IMU), for example. By removing the component attributed to the lateral tilt angle of the vehicle body 2, the actual lateral acceleration Gy of the vehicle 1 can be obtained more accurately.

Figure 2:
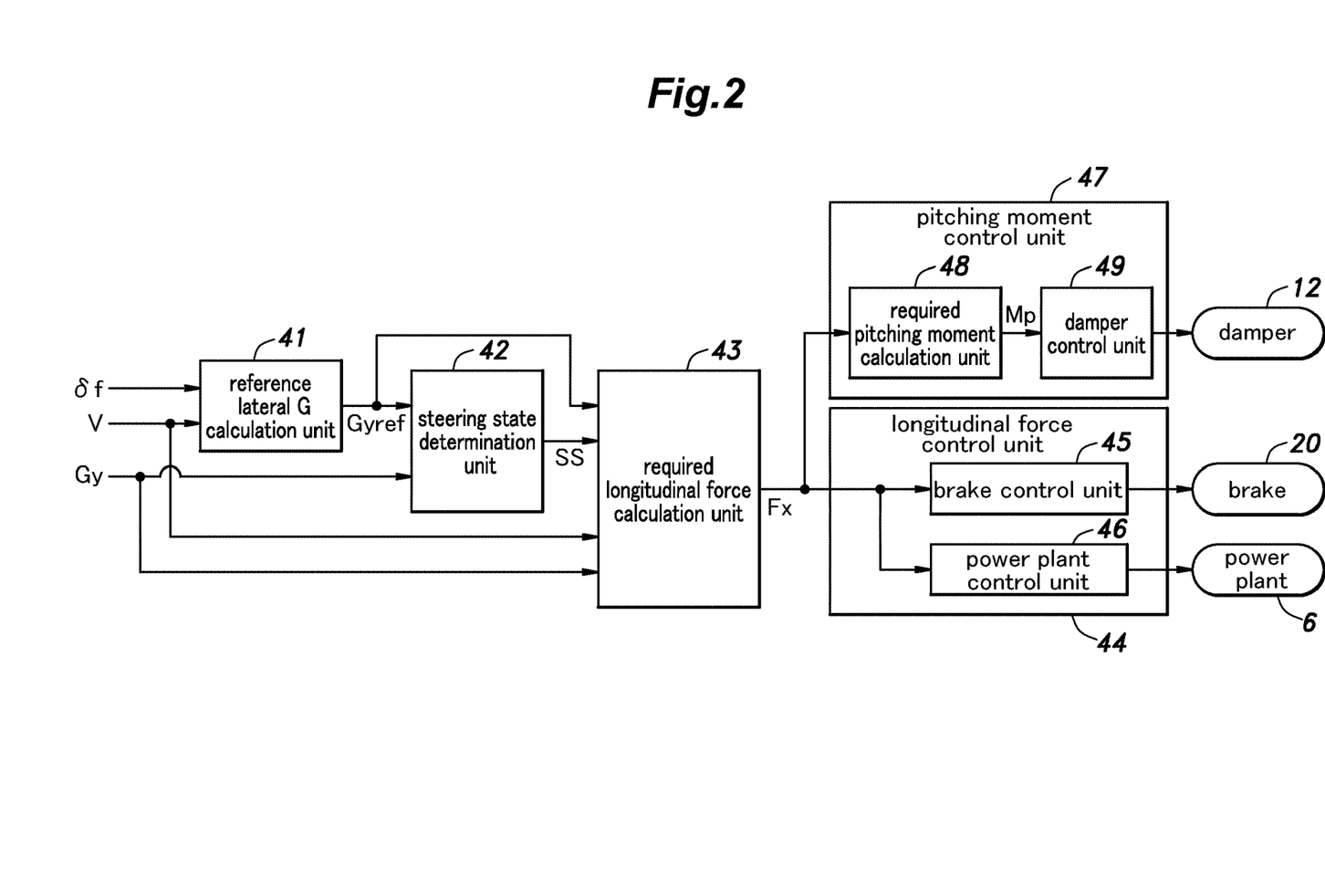
FIG. 2 is a functional block diagram of a control device shown in FIG. 1.

FIG. 2 is a functional block diagram of the control device 31 shown in FIG. 1. As shown in FIG. 2, the control device 31 includes a reference lateral acceleration calculation unit (hereinafter referred to as a reference lateral G calculation unit) 41. The reference lateral G calculation unit 41 calculates a reference lateral acceleration Gyref that should be generated in the vehicle 1 based on the front wheel steering angle δf and the vehicle speed V. For instance, the reference lateral G calculation unit 41 calculates the reference lateral acceleration Gyref by referring to a map that sets the values of the reference lateral acceleration Gyref in relation to the front wheel steering angle δf and the vehicle speed V based on the vehicle specifications with an assumption that the vehicle travels on a paved, dry road surface. The reference lateral acceleration Gyref is calculated to have a larger absolute value for a larger absolute value of the front wheel steering angle δf and for a larger absolute value of the vehicle speed V. The reference lateral acceleration Gyref calculated by the reference lateral G calculation unit 41 is used in the processing performed by a steering state determination unit 42 and the processing performed by a required longitudinal force calculation unit 43.

The steering state determination unit 42 determines a steering state (understeer or oversteer) when the vehicle 1 makes a turn by comparing the reference lateral acceleration Gyref and the actual lateral acceleration Gy. Specifically, when a value obtained by subtracting the actual lateral acceleration Gy from the reference lateral acceleration Gyref is greater than or equal to 0 and both the reference lateral acceleration Gyref and the actual lateral acceleration Gy are greater than or equal to 0, the steering state determination unit 42 determines that the vehicle 1 is understeer in the left turn. When the value obtained by subtracting the actual lateral acceleration Gy from the reference lateral acceleration Gyref is less than or equal to 0 and both the reference lateral acceleration Gyref and the actual lateral acceleration Gy are less than or equal to 0, the steering state determination unit 42 determines that the vehicle 1 is understeer in the right turn. On the other hand, when the value obtained by subtracting the actual lateral acceleration Gy from the reference lateral acceleration Gyref is less than or equal to 0 or the reference lateral acceleration Gyref is less than or equal to 0, and the actual lateral acceleration Gy is greater than or equal to 0, the steering state determination unit 42 determines that the vehicle 1 is oversteer in the left turn. Also, when the value obtained by subtracting the actual lateral acceleration Gy from the reference lateral acceleration Gyref is greater than or equal to 0 or the reference lateral acceleration Gyref is greater than or equal to 0, and the actual lateral acceleration Gy is less than or equal to 0, the steering state determination unit 42 determines that the vehicle 1 is oversteer in the right turn. The steering state determination unit 42 outputs a steering state SS that indicates the determined turning state and steering state. The steering state SS is used in the processing performed by the required longitudinal force calculation unit 43.

The required longitudinal force calculation unit 43 calculates a required longitudinal force Fx for making the steering state of the vehicle 1 approach the neutral steering state based on the steering state SS, the reference lateral acceleration Gyref, the actual lateral acceleration Gy, and the vehicle speed V. In other words, the required longitudinal force calculation unit 43 calculates a required longitudinal force Fx for reducing a lateral G deviation $\Delta$Gy1 (FIG. 3), which is a deviation of the actual lateral acceleration Gy relative to the reference lateral acceleration Gyref, depending on the steering state SS (or depending on the turning direction which may be indicated by the steering angle $\delta$f). The concrete processing performed by the required longitudinal force calculation unit 43 will be described in detail later. The required longitudinal force Fx calculated by the required longitudinal force calculation unit 43 is used in the processing performed by a longitudinal force control unit 44 and the processing performed by a pitching moment control unit 47.

The longitudinal force control unit 44 includes a brake control unit 45 configured to control the brakes 20 and a power plant control unit 46 configured to control the power plant 6. The longitudinal force control unit 44 controls an output of the brakes 20 and/or the power plant 6 through the processing performed by the brake control unit 45 and the power plant control unit 46 to generate the required longitudinal force Fx.

The pitching moment control unit 47 controls the pitching moment generated in the vehicle body 2 by controlling the damping force of the dampers 12 and includes a required pitching moment calculation unit 48 and a damper control unit 49 serving as a suspension control unit. The required pitching moment calculation unit 48 calculates, as the required pitching moment Mp, a pitching moment in a direction to cancel out the pitching moment generated in the vehicle body 2 due to the required longitudinal force Fx. For example, in the case where the required longitudinal force Fx is a force that decelerates the vehicle 1, a nose-down pitching moment acts on the vehicle body 2, and therefore, the required pitching moment calculation unit 48 calculates a nose-up pitching moment for canceling it out as the required pitching moment Mp. Conversely, in the case where the required longitudinal force Fx is a force that accelerates the vehicle 1, the required pitching moment calculation unit 48 calculates a nose-down pitching moment as the required pitching moment Mp. The damper control unit 49 controls the damping force of the dampers 12 such that the required pitching moment Mp is generated in the vehicle body 2.

Figure 4:
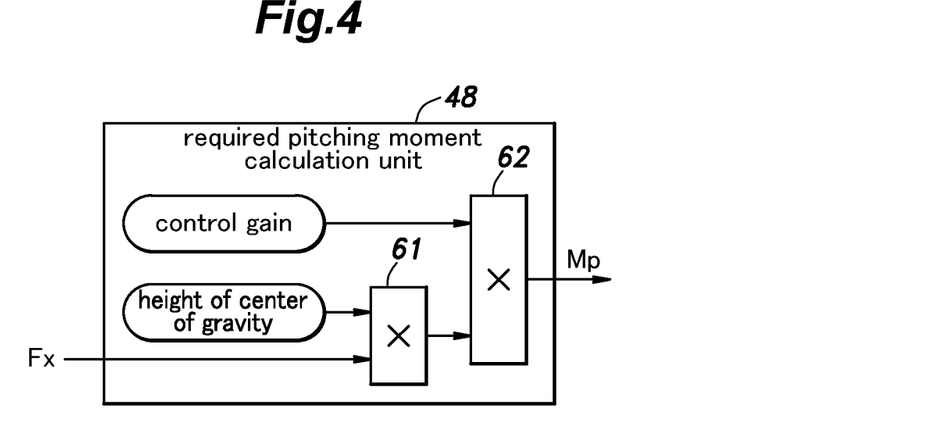
FIG. 4 is a functional block diagram of a required pitching moment calculation unit shown in FIG. 2.

FIG. 4 is a functional block diagram of the required pitching moment calculation unit 48 shown in FIG. 2. With reference to FIG. 4, the concrete processing performed by the required pitching moment calculation unit 48 will be described below. The required pitching moment calculation unit 48 stores a height of the center of gravity of the vehicle 1 and a control gain, and includes a first multiplier 61 and a second multiplier 62. In the required pitching moment calculation unit 48, the first multiplier 61 multiplies the required longitudinal force Fx by the height of the center of gravity to calculate the pitching moment generated in the vehicle body 2 due to the required longitudinal force Fx. The second multiplier 62 multiplies the pitching moment calculated by the first multiplier 61 by the control gain to calculate the required pitching moment Mp that should be generated in the vehicle body 2 by the dampers 12.

Figure 3:
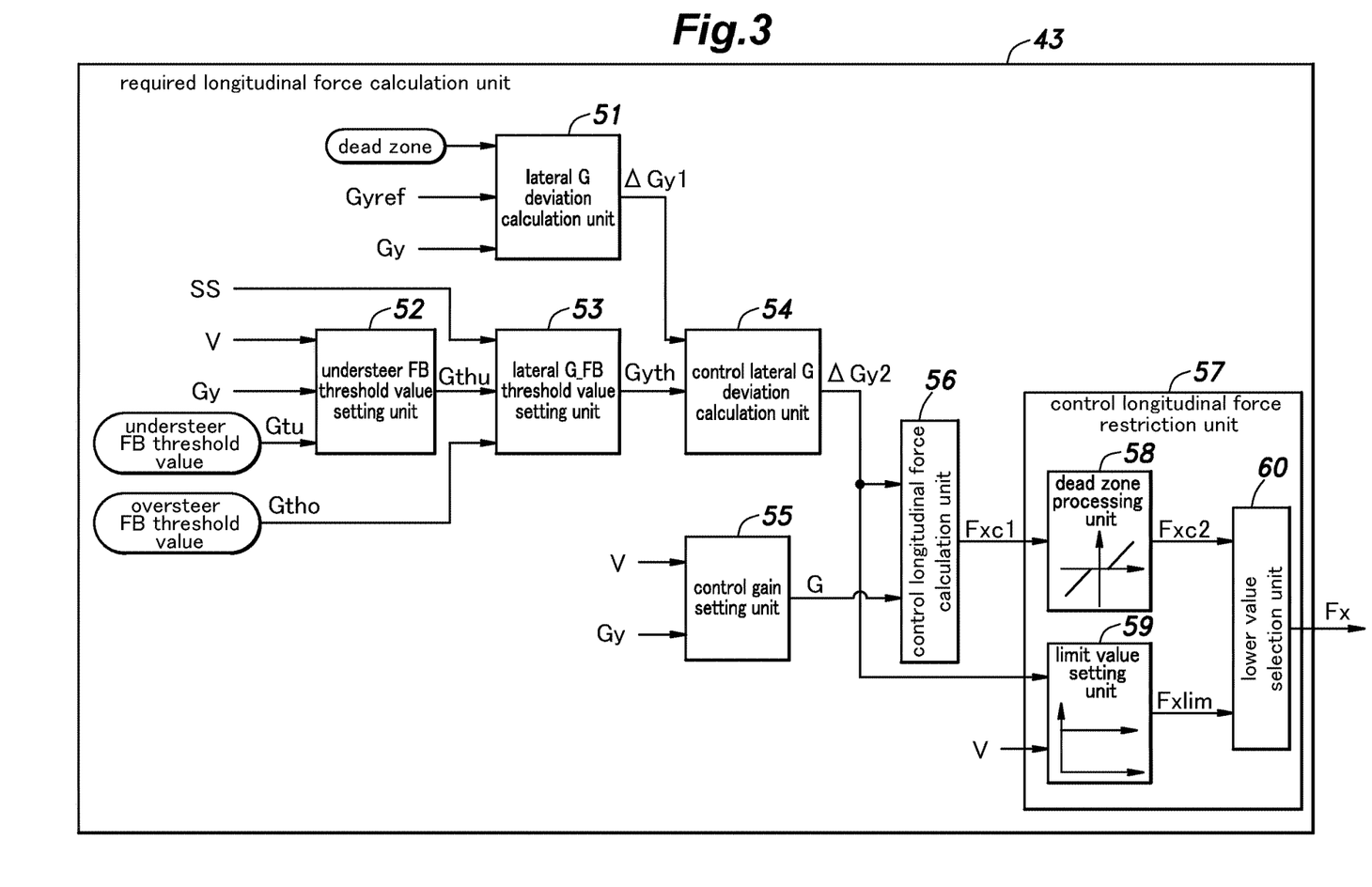
FIG. 3 is a functional block diagram of a required longitudinal force calculation unit shown in FIG. 2.

FIG. 3 is a functional block diagram of the required longitudinal force calculation unit 43 shown in FIG. 2. With reference to FIG. 3, the concrete processing performed by the required longitudinal force calculation unit 43 will be described below. The required longitudinal force calculation unit 43 includes a lateral G deviation calculation unit 51. The lateral G deviation calculation unit 51 calculates a lateral G deviation $\Delta$Gy1 which is a deviation of the actual lateral acceleration Gy relative to the reference lateral acceleration Gyref. In the present embodiment, a dead zone is provided to each of the reference lateral acceleration Gyref and the actual lateral acceleration Gy such that the lateral G deviation $\Delta$Gy1 is calculated from the reference lateral acceleration Gyref and the actual lateral acceleration Gy modified by the respective dead zones. For instance, the reference lateral acceleration Gyref may be modified by the dead zone, as follows:

If $LM1 < Gy\text{ref}$, modified $Gy\text{ref}=Gy\text{ref}-LM1$;

If $LM2 \leq Gy\text{ref} \leq TH1$, modified $Gy\text{ref}=0$; and

If $Gy\text{ref} < LM2$, modified $Gy\text{ref}=Gy\text{ref}-LM2$, where LM1 is an upper limit of the dead zone and LM2 is a lower limit of the dead zone. In the present embodiment, LM1 has a positive value, LM2 has a negative value, and the absolute value of LM1 is equal to the absolute value of LM2; namely, the dead zone is symmetric about zero.

Similarly, the actual lateral acceleration Gy may be modified by the dead zone, as follows:

If $LM3 < Gy$, modified $Gy=Gy-LM3$;

If $LM4 \leq Gy \leq TH1$, modified $Gy=0$; and

If $Gy < LM4$, modified $Gy=Gy-LM4$, where LM3 is an upper limit of the dead zone and LM4 is a lower limit of the dead zone. In the present embodiment, LM3 has a positive value, LM4 has a negative value, and the absolute value of LM3 is equal to the absolute value of LM4. The upper and lower limits LM1, LM2 of the dead zone for the reference lateral acceleration Gyref may be equal to the upper and lower limits LM3, LM4 of the dead zone for the actual lateral acceleration Gy, respectively; namely, the dead zone for the reference lateral acceleration Gyref may be the same as the dead zone for the actual lateral acceleration Gy.

The lateral G deviation calculation unit 51 subtracts the corrected actual lateral acceleration Gy from the corrected reference lateral acceleration Gyref to calculate the lateral G deviation $\Delta$Gy1. The lateral G deviation $\Delta$Gy1 is used in the processing performed by a control lateral G deviation calculation unit 54.

The required longitudinal force calculation unit 43 further includes an understeer FB threshold value setting unit 52. The understeer FB threshold value setting unit 52 calculates an understeer FB threshold value Gtu based on the vehicle speed V and the actual lateral acceleration Gy by referring to a map, for example. Also, the understeer FB threshold value setting unit 52 stores a predetermined understeer FB threshold value Gtu, and selects one of the calculated understeer FB threshold value Gtu and the stored understeer FB threshold value Gtu according to a selection signal, and sets the selected threshold value as an understeer set FB threshold value Gthu. The understeer set FB threshold value Gthu is used in the processing performed by a lateral G_FB threshold value setting unit 53.

The lateral G_FB threshold value setting unit 53 stores a predetermined oversteer FB threshold value Gtho. The lateral G_FB threshold value setting unit 53 selects one of the understeer set FB threshold value Gthu and the oversteer FB threshold value Gtho according to the steering state SS, and sets the selected threshold value as an FB threshold value Gyth which is a control threshold value for the lateral G deviation $\Delta Gy1$. Specifically, when the steering state SS is understeer, the lateral G_FB threshold value setting unit 53 sets the understeer set FB threshold value Gthu as the FB threshold value Gyth. On the other hand, when the steering state SS is oversteer, the lateral G_FB threshold value setting unit 53 sets the oversteer FB threshold value Gtho as the FB threshold value Gyth. The FB threshold value Gyth is used in the processing performed by the control lateral G deviation calculation unit 54.

The control lateral G deviation calculation unit 54 provides a dead zone defined by the FB threshold value Gyth to the lateral G deviation $\Delta Gy1$ to calculate a control lateral G deviation $\Delta Gy2$, wherein the dead zone has an upper limit equal to an absolute value of the FB threshold value Gyth and a lower limit equal to −1 multiplied by the absolute value of the FB threshold value Gyth. Namely, the control lateral G deviation calculation unit 54 calculates the control lateral G deviation $\Delta Gy2$ from the lateral G deviation $\Delta Gy1$ as follows:

If $|Gyth|<\Delta Gy1, \Delta Gy2=\Delta Gy1-|Gyth|$;

If $-|Gyth|\leq\Delta Gy1\leq|Gyth|, \Delta Gy2=0$; and

If $\Delta Gy1<-|Gyth|, \Delta Gy2=\Delta Gy1+|Gyth|$.

The control lateral G deviation $\Delta Gy2$ is used in the processing performed by a control longitudinal force calculation unit 56 and the processing performed by a control longitudinal force restriction unit 57.

The required longitudinal force calculation unit 43 also includes a control gain setting unit 55. The control gain setting unit 55 sets a control gain G based on the vehicle speed V and the actual lateral acceleration Gy by referring to a map, for example. The control gain G is used in the processing performed by the control longitudinal force calculation unit 56.

The control longitudinal force calculation unit 56 calculates a control longitudinal force Fxc1 by multiplying the control lateral G deviation $\Delta Gy2$ by the control gain G, where the control longitudinal force Fxc1 is a base value for the required longitudinal force Fx. In other words, the control longitudinal force calculation unit 56 calculates the control longitudinal force Fxc1 to perform proportional control of the required longitudinal force Fx based on the control lateral G deviation $\Delta Gy2$. Namely, the control longitudinal force Fxc1 for performing feedback control of the required longitudinal force Fx based on the lateral G deviation $\Delta Gy1$ is calculated by the control lateral G deviation calculation unit 54, the control gain setting unit 55, and the control longitudinal force calculation unit 56. The control longitudinal force Fxc1 is used in the processing performed by the control longitudinal force restriction unit 57. It is to be noted that the sign (positive or negative) of the control longitudinal force Fxc1 can be determined appropriately by the control longitudinal force calculation unit 56 based on the steering state SS or the turning direction, which can be indicated by the steering angle $\delta f$, such that the generation of the required longitudinal force Fx determined based on the control longitudinal force Fxc1 reduces the lateral G deviation $\Delta Gy1$.

The control longitudinal force restriction unit 57 includes a dead zone processing unit 58. The dead zone processing unit 58 provides a predefined dead zone to the control longitudinal force Fxc1 and calculates a pre-restriction control longitudinal force Fxc2 as follows:

If $LM5<Fxc1, Fxc2=Fxc1-LM5$;

If $LM6\leq Fxc1\leq LM5, Fxc2=0$; and

If $Fxc1<LM6, Fxc2=Fxc1-LM6$, where LM5 is an upper limit of the dead zone and LM6 is a lower limit of the dead zone. In the present embodiment, LM5 has a positive value, LM6 has a negative value, and the absolute value of LM5 is equal to the absolute value of LM6; namely, the dead zone is symmetric about zero. The pre-restriction control longitudinal force Fxc2 is used in the processing performed by a lower value selection unit 60.

The control longitudinal force restriction unit 57 further includes a limit value setting unit 59. The limit value setting unit 59 sets a longitudinal force limit value Fxlim based on the control lateral G deviation $\Delta Gy2$ and the vehicle speed V by referring to a map, for example. The longitudinal force limit value Fxlim is a control maximum value for the required longitudinal force Fx. The longitudinal force limit value Fxlim is used in the processing performed by the lower value selection unit 60.

The lower value selection unit 60 selects a lower one (or the one having a smaller absolute value) of the pre-restriction control longitudinal force Fxc2 and the longitudinal force limit value Fxlim, and outputs the selected one of the pre-restriction control longitudinal force Fxc2 and the longitudinal force limit value Fxlim as the required longitudinal force Fx. As described with reference to FIG. 2, the required longitudinal force Fx is used in the processing performed by the longitudinal force control unit 44 and the processing performed by the pitching moment control unit 47.

In the following, a mode of operation and effects of the vehicle motion control system 30 configured as above will be described.

As shown in FIG. 2, in the vehicle motion control system 30, the reference lateral G calculation unit 41 calculates the reference lateral acceleration Gyref based on the front wheel steering angle $\delta f$ and the vehicle speed V, and the steering state determination unit 42 determines the steering state SS based on the actual lateral acceleration Gy and the reference lateral acceleration Gyref. Then, the required longitudinal force calculation unit 43 calculates the required longitudinal force Fx for reducing the lateral G deviation $\Delta Gy1$ in accordance with the steering state SS, and the longitudinal force control unit 44 controls the output of the brakes 20 and/or the power plant 6 to generate the required longitudinal force Fx.

When the actual lateral acceleration Gy is lower (or smaller in absolute value) than the reference lateral acceleration Gyref, a required longitudinal force Fx for reducing the lateral G deviation $\Delta Gy1$ (which is a deviation of the actual lateral acceleration Gy from the reference lateral acceleration Gyref), namely, a braking force, is output to the brake 20 and/or the power plant 6. Thereby, the vehicle speed V is lowered such that the radius of the travel trajectory of the vehicle 1 is prevented from becoming larger than intended.

Figure 5:
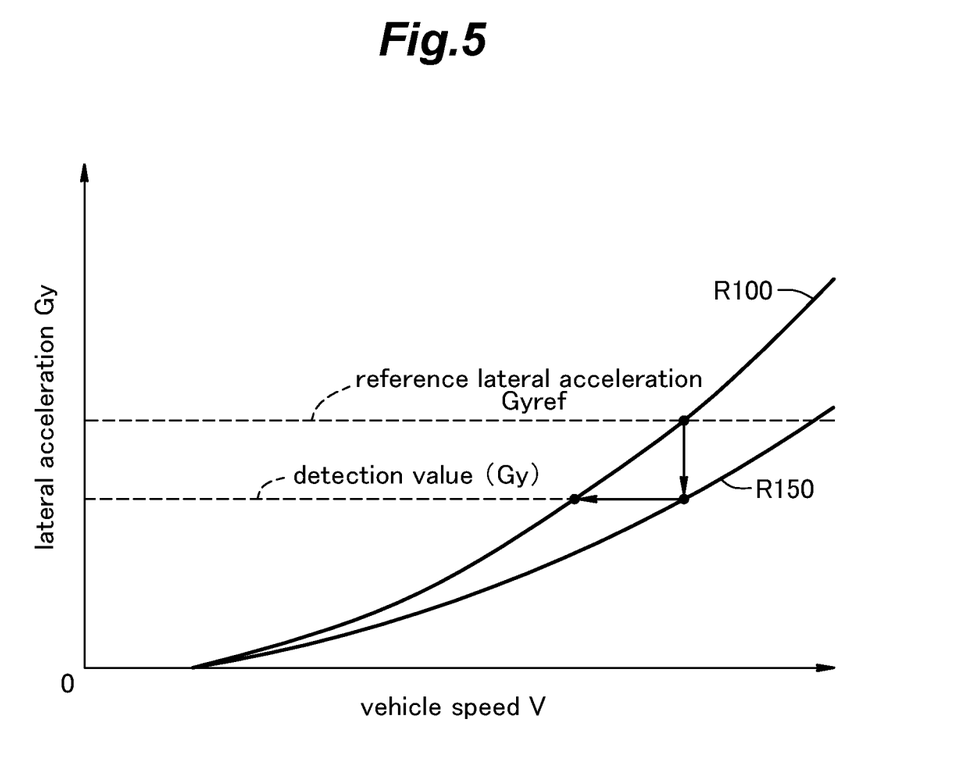
FIG. 5 is a graph for explaining a change of a turning trajectory caused by the vehicle motion control system shown in FIG. 1.

FIG. 5 is a graph for explaining a change of a turning trajectory caused by the vehicle motion control system 30 shown in FIG. 1. It is to be noted that FIG. 5 is a graph showing the relationship between the lateral acceleration Gy (or reference lateral acceleration Gyref) and the vehicle speed V for the left turn. As will be understood by a person having ordinary skill in the art, a graph for the right turn may be obtained by vertically reversing FIG. 5. As shown in FIG. 5, when the driver performs a steering operation corresponding to a curve having a radius of 100 m (R100), for example, the reference lateral acceleration Gyref calculated based on the front wheel steering angle δf and the vehicle speed V is positioned on a curved line in FIG. 5 defining the relationship between the reference lateral acceleration Gyref and the vehicle speed V for the front wheel steering angle δf corresponding to the curve of R100. However, if the vehicle 1 travels on a low-μ road having a low road friction coefficient, the vehicle 1 becomes understeer, and may follow a turning trajectory corresponding to a curve having a radius of 150 m (R150), for example. In such a case, the vehicle motion control system 30 controls the output of the brakes 20 and/or the power plant 6 to generate a required longitudinal force Fx for braking, whereby the vehicle speed V is lowered and the reference lateral acceleration Gyref is lowered accordingly. This reduces the lateral G deviation ΔGy1 which is a deviation of the actual lateral acceleration Gy relative to the reference lateral acceleration Gyref. This enables the vehicle 1 to follow the turning trajectory corresponding to the curve of R100 as intended by the driver, that is, prevents the trajectory of the vehicle 1 from becoming different from the one intended by the driver when the vehicle 1 makes a turn. Particularly, the vehicle 1 is prevented from deviating from the intended trajectory outward when the vehicle 1 travels around a curve of a low-μ road.

As shown in FIG. 3, in the required longitudinal force calculation unit 43, the lateral G deviation calculation unit 51 provides a dead zone to the reference lateral acceleration Gyref and the actual lateral acceleration Gy and calculates the lateral G deviation ΔGy1 based on the reference lateral acceleration Gyref and the actual lateral acceleration Gy modified by the dead zone. This prevents the lateral G deviation ΔGy1 from changing frequently due to the noise in the output from the front wheel steering angle sensor 34, the vehicle speed sensor 33, and/or the lateral acceleration sensor 35, and therefore, deterioration of the driving stability of the vehicle 1 due to frequent change of the required longitudinal force Fx can be suppressed.

In the required longitudinal force calculation unit 43, the control lateral G deviation calculation unit 54, the control gain setting unit 55, and the control longitudinal force calculation unit 56 cooperate to calculate the required longitudinal force Fx as a feedback control process based on the lateral G deviation ΔGy1. Thereby, the required longitudinal force Fx necessary to maintain the travel trajectory can be calculated at an appropriate time by the feedback control based on the lateral G deviation ΔGy1, and therefore, the lateral G deviation ΔGy1 is prevented from becoming excessively large, namely, the trajectory of the vehicle 1 is prevented from deviating outward when the vehicle 1 makes a turn.

In the required longitudinal force calculation unit 43, the understeer FB threshold value setting unit 52 and the lateral G_FB threshold value setting unit 53 set the FB threshold value Gyth, which is a control threshold value for the lateral G deviation ΔGy1, according to the steering state SS, the vehicle speed V, and the actual lateral acceleration Gy. Further, the control lateral G deviation calculation unit 54 provides a dead zone to the lateral G deviation ΔGy1, in which the dead zone is defined by the FB threshold value Gyth, to calculate the control lateral G deviation ΔGy2 serving as a control deviation such that feedback control is performed using the control lateral G deviation ΔGy2. This allows the degree of intervention of control for generating the required longitudinal force Fx to be varied depending on the driving state parameters, such as the steering state SS, the vehicle speed V, and the actual lateral acceleration Gy, whereby the degree of freedom in setting of the longitudinal force control is improved. It is to be noted that the FB threshold value Gyth may be set based on at least one of the steering state SS, the vehicle speed V, and the actual lateral acceleration Gy.

In the required longitudinal force calculation unit 43, the control longitudinal force calculation unit 56 calculates the required longitudinal force Fx by multiplying the control lateral G deviation ΔGy2 by the control gain G, such that proportional control based on the control lateral G deviation ΔGy2 is performed. Since the calculation load for the required longitudinal force Fx is small, the required longitudinal force Fx corresponding to the control lateral G deviation ΔGy2 can be calculated immediately. Therefore, the trajectory of the vehicle 1 is prevented from deviating from the one intended by the driver.

In the required longitudinal force calculation unit 43, the control longitudinal force restriction unit 57 sets the longitudinal force limit value Fxlim for the required longitudinal force Fx based on the control lateral G deviation ΔGy2 and the vehicle speed V and the required longitudinal force Fx is limited by the longitudinal force limit value Fxlim. This prevents the driver from experiencing discomfort caused by the generation of a large required longitudinal force Fx that is not attributed to the driver's operation.

In the required longitudinal force calculation unit 43, the control longitudinal force restriction unit 57 provides a dead zone to the required longitudinal force Fx, whereby frequent switching of the sign (positive or negative) of the required longitudinal force Fx can be prevented. This prevents the driver from experiencing discomfort caused by the generation of the required longitudinal force Fx.

As shown in FIGS. 1 and 2, the vehicle motion control system 30 includes the suspension devices 3 for generating a pitching moment in the vehicle body 2 and the pitching moment control unit 47 configured to control the pitching moment generated by the suspension devices 3. In the pitching moment control unit 47, the required pitching moment calculation unit 48 calculates, as the required pitching moment Mp, a pitching moment in a direction to cancel out the pitching moment caused due to the required longitudinal force Fx, and the damper control unit 49 serving as a suspension control unit controls the dampers 12 of the suspension devices 3 such that the required pitching moment Mp is generated. This prevents the driver from experiencing discomfort by a pitching moment that could be caused to act on the vehicle 1 due to the generation of the required longitudinal force Fx.

As shown in FIG. 1, the suspension devices 3 include the dampers 12 of a variable damping force type, and thus, the required pitching moment Mp can be generated by using the dampers 12 available as existing products, without a need for dedicated components.

A concrete embodiment has been described in the foregoing, but various modifications and alterations of the present invention are possible without being limited by the above embodiment. For example, the suspension devices 3 may include air suspension devices in place of the variable damping force dampers 12 or in addition to the dampers 12. In such a configuration, it is possible to cause the air suspension devices to generate a larger required pitching moment Mp to cancel out the pitching moment caused due to the required longitudinal force Fx, which more effectively prevents the driver from experiencing discomfort. Besides, the concrete structure, arrangement, number, etc. of the components/units as well as the control procedure in the embodiment may be appropriately changed within the scope of the present invention. Also, not all of the structural elements shown in the above embodiment are necessarily indispensable and they may be selectively adopted as appropriate.

The invention claimed is:

1. A vehicle motion control system, comprising:
a steering angle sensor for detecting a steering angle;
a vehicle speed sensor for detecting a vehicle speed;
a lateral acceleration sensor for detecting an actual lateral acceleration of a vehicle body;
a reference lateral acceleration calculation unit configured to calculate a reference lateral acceleration from the steering angle and the vehicle speed;
a required longitudinal force calculation unit configured to calculate a required longitudinal force for reducing a deviation of the actual lateral acceleration relative to the reference lateral acceleration; and
a longitudinal force control unit configured to control an output of at least one of a brake and a power plant such that the required longitudinal force is generated.

2. The vehicle motion control system according to claim 1, wherein a dead zone is provided to each of the reference lateral acceleration and the actual lateral acceleration.

3. The vehicle motion control system according to claim 1, wherein the required longitudinal force calculation unit is configured to calculate the required longitudinal force as a feedback control process based on the deviation.

4. The vehicle motion control system according to claim 3, further comprising a steering state determination unit configured to determine a steering state based on the actual lateral acceleration and the reference lateral acceleration, wherein the required longitudinal force calculation unit is configured to set a threshold value for the deviation according to at least one of the steering state, the vehicle speed, and the actual lateral acceleration and to perform the feedback control process based on a control deviation that is obtained by providing a dead zone defined by the threshold value to the deviation.

5. The vehicle motion control system according to claim 4, wherein the required longitudinal force calculation unit is configured to calculate the required longitudinal force by multiplying the control deviation by a control gain.

6. The vehicle motion control system according to claim 4, wherein the required longitudinal force calculation unit is configured to set a limit value for the required longitudinal force according to the control deviation and the vehicle speed and to limit the required longitudinal force to the limit value.

7. The vehicle motion control system according to claim 1, wherein a dead zone is provided to the required longitudinal force.

8. The vehicle motion control system according to claim 1, further comprising:
a suspension device configured to be capable of generating a pitching moment in the vehicle body; and
a pitching moment control unit configured to control the pitching moment generated by the suspension device,
wherein the pitching moment control unit comprises:
a required pitching moment calculation unit configured to calculate a required pitching moment which is a pitching moment in a direction to cancel out a pitching moment caused due to the required longitudinal force; and
a suspension control unit configured to control the suspension device to generate the required pitching moment.

9. The vehicle motion control system according to claim 8, wherein the suspension device includes at least one of a variable damping force damper and an air suspension device.

* * * * *